Feb. 13, 1962 W. G. WHITNEY 3,021,143

PHONOGRAPHIC MACHINE

Filed Oct. 21, 1959 5 Sheets-Sheet 1

INVENTOR.
WILLIAM G. WHITNEY

BY George H. Fritzinger

AGENT

INVENTOR.
WILLIAM G. WHITNEY
BY George H. Fritzinger
AGENT

INVENTOR.
WILLIAM G. WHITNEY
BY George H. Fritzinger
AGENT

Feb. 13, 1962 W. G. WHITNEY 3,021,143

PHONOGRAPHIC MACHINE

Filed Oct. 21, 1959 5 Sheets-Sheet 4

INVENTOR.
WILLIAM G. WHITNEY

BY George H. Fritzinger

AGENT

Feb. 13, 1962 W. G. WHITNEY 3,021,143

PHONOGRAPHIC MACHINE

Filed Oct. 21, 1959 5 Sheets-Sheet 5

INVENTOR.
WILLIAM G. WHITNEY
BY George H. Fritzinger
AGENT 3,021,143
PHONOGRAPHIC MACHINE William G. Whitney, Wayne Township, Passaic County, N.J., assignor to McGraw-Edison Company, Elgin, Ill., a corporation of Delaware Filed Oct. 21, 1959, Ser. No. 847,799
16 Claims. (Cl. 274—4)

This invention relates to phonographic machines adapted especially for the recordation and reproduction of dictation, and more particularly it relates to new and improved operating mechanisms for dictating machines which use a magnetic record medium.

The present dictating machine is provided with control mechanisms to enable the dictator to listen back with ease to selected portions of his recorded dictation and to return quickly to the prior recorded position of farthest advance for resumption of the recording operation. When a magnetic record medium is used without tracking facility for the record-reproduce head, it is necessary during backspacing that the translating head be stopped "in track," and during subsequent advancing of the head to resume the recordation of dictation that the head be again stopped at or beyond the prior position of farthest advance in registration with the projected track on the record.

An object of this invention is to provide an improved drive mechanism of a unitary character adapted both for progressively advancing the translating head relative to the record during normal recording and reproducing and for fast scanning of the head to backspace positions for "in track" reproduction of portions of the recorded dictation as well as for fast advancing of the head for "in track" resumption of recording.

Another object is to provide a novel advance marker having a high resolving power to enable a resumption of recording after a backspacing operation with a minimum gap on the record.

These improved results are attained with the use of a lead screw for effecting the traveling movement between the record and translating device in which the lead screw is driven through a planetary gear mechanism comprising two coaxial gears with different numbers of teeth and a single planetary gear meshing therewith, in which one coaxial gear is held stationary and the planetary gear is revolved to effect a slow traveling movement during the normal record and reproduce operations, and in which the planetary gear is held from revolving and the stated one coaxial gear is rotated to effect a fast traveling movement as when the translating device is to be moved quickly to selected portions on the record. An "in-track" control of the translating device is achieved by a one revolution brake or latch operating on a drive member which during scanning is turned one revolution for each increment of traveling movement equal to the pitch between successive track convolutions on the record. A high resolving power in the advance mechanism is achieved in a small space by using a measuring element mounted to move in a helical path.

These and other objects and features of the invention will be apparent from the following description and the appended claims.

In the description of the invention reference is had to the accompanying drawings, of which:

Figure 1:
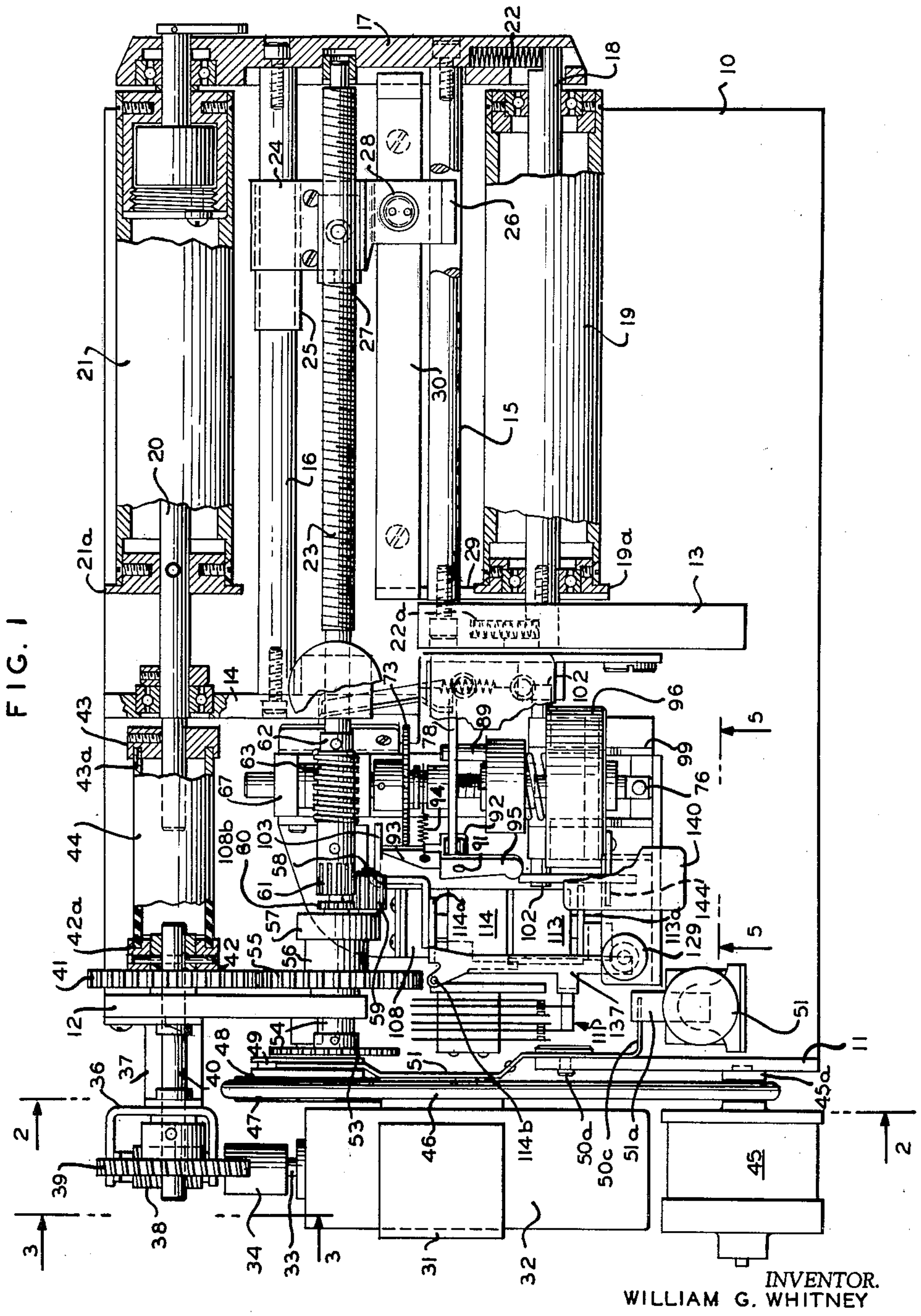
FIGURE 1 is a plan view of the machine with parts shown in section.

With reference first to FIGURE 1, the machine comprises a base plate 10 having upright standards 11 and 12 at its left side and has front and back standards 13 and 14 at its central portion. Secured to the standards 13 and 14 by screws as shown are parallel rods 15 and 16 extending left to right to the right side of the machine whereat they are joined by a horizontal tie bar 17 secured thereto also by screws. Journaled between the standard 13 and the tie bar 17 at the front portion of the machine on a shaft 18 is a mandrel 19. Similarly at the rearward portion of the machine there is a shaft 20 journaled between the standard 14 and the tie bar 17 which carries a mandrel 21. The mandrels are mounted parallel to each other, with one positioned directly behind the other, for carrying a wide endless magnetic belt (not shown) which is turned in a revolving manner through one complete revolution as the back mandrel 21 is driven through three revolutions. The front mandrel is shiftable rearwardly against a pair of springs 22 and **22*a* so as to permit easy mounting of the belt on the mandrels from the right end of the machine, the belt being mounted in enveloping relation around the tie bar 17 and slid across the mandrels until it abutts against end flanges 19*a* and 21*a* thereof. After the belt is so mounted the front mandrel is released and pressed forwardly by the springs 22 and 22*a*** to hold the belt in a tautened condition.

Positioned between the parallel supporting rods 15 and 16 is a feed screw 23 journaled between the standard 14 and the tie bar 17. Mounted slidably on the support rods 15 and 16 is a carriage 24 having a long sleeve 25 embracing the rod 16 and a forward arm 26 resting slidably on the rod 15. Mounted on the intermediate portion of this carriage is a feed nut 27 engaging the feed screw 23 and mounted on the carriage just ahead of the feed screw is a record-reproduce head 28 for recording on and reproducing from the magnetic belt. Supported on a rocker 29 pivoted to the standard 13 is a long left to right extending arm 30 which slidably supports the portion of the magnetic belt engaged by the record-reproduce head 28.

The details of construction of the mechanism so far described, as well as the control means by which the front mandrel 19 is shifted back and forth and the arm 30 is shifted up and down for record mounting and removal need not however be herein described for purposes of the present invention.

Figure 4:
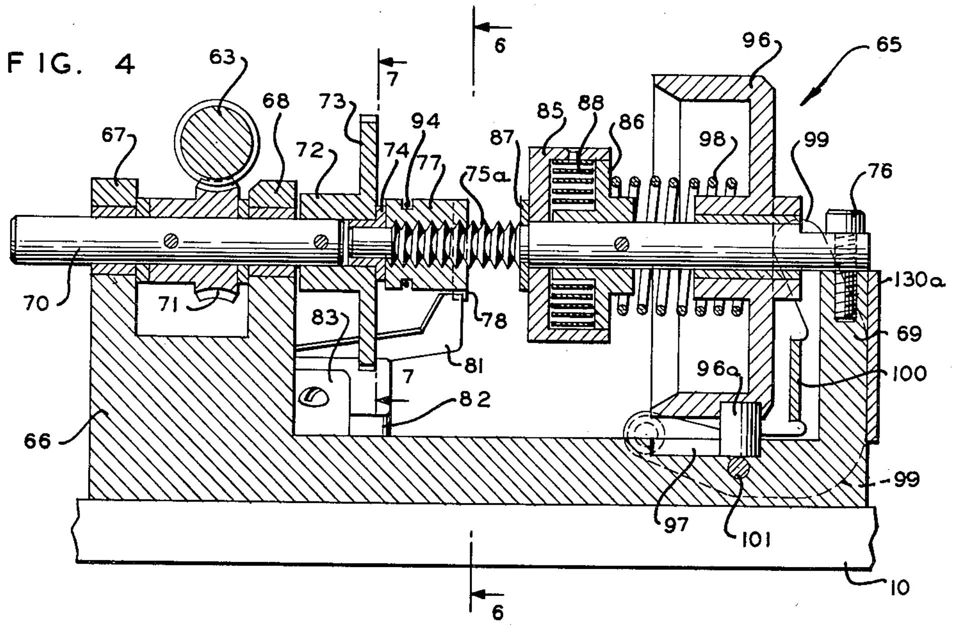
FIGURE 4 is a sectional view taken on the line 4—4 of FIGURE 5.
Figure 3:
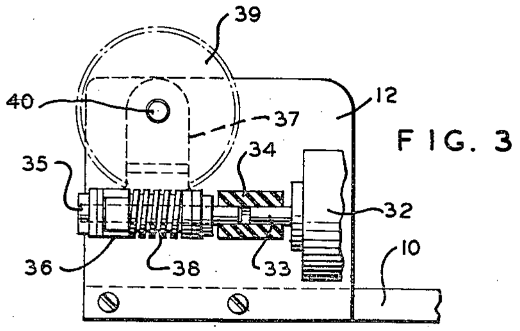
FIGURE 3 is a sectional view taken on the line 3—3 of FIGURE 1.

Mounted at the left side of the machine on a bracket 31 is a motor 32 extending in a rearward direction and having its shaft 33 coupled through a rubber tube 34 to a shaft 35 (FIGURES 3 and 4). The shaft 35 is journaled in the arms of a yoke 36 mounted on a U bracket 37 carried by the standard 12. Secured to the shaft 35 between the arms of the yoke 36 is a worm 38 in mesh with a gear 39. The gear 39 is secured to a short shaft 40 axial in line with the shaft 20 of the mandrel 21. The shaft 40 is journaled in bearings formed in the U bracket 37, and extends rightwardly through the standard 12. Secured to the shaft 40 at the right side of the standard 12 is a gear 41 provided with a hub 42 having a groove 42*a* in its end face concentric with the shaft 40 and near the rim of the hub. Likewise on the shaft 20 there is a similar hub 43 having a groove 43*a* in its end face confronting that of the hub 42. Interposed between the hubs 42 and 43 is a rubber tube 44 which fits into the grooves 42*a* and 43*a* and is secured therein by crimping down the metal of the hubs at the outer side of the grooves. The rubber tube forms a resilient coupling between the drive shaft 40 and the driven shaft 20 of the mandrel 21 to allow for any slight misalignment in these shafts.

Figure 2:
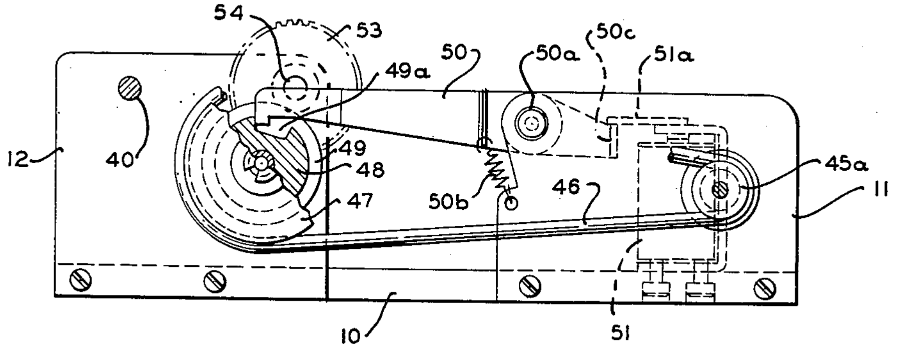
FIGURE 2 is a sectional view showing portions broken away and taken on the line 2—2 of FIGURE 1.

Mounted at the left side of the machine to the front of the drive motor 32 is a so-called scan motor 45 for fast driving the carriage 24 in a reverse direction when it is to be returned to home position and also when it is to be backspaced to listen back to selected portions of one's recorded dictation and for fast driving the carriage in a forward direction when it is to be advanced again to its prior position of farthest advance to resume recording. The scan motor 45 has a drive pulley 45*a* coupled by a belt 46 to a driven pulley 47 journalled in the standard 12 and shown particularly in FIGURE 2. The pulley 47 has a hub 48 provided with a peripheral groove 49 in which there is a notch 49*a* engageable by a pawl 50 pivoted at 50*a* to the standard 11. The pawl 50 is biased by a spring 50*b* into the notch 49*a* and is disengageable therefrom by an "in-track" or centralizing solenoid 51 having an armature 51*a* operable against an arm 50*c* of the pawl 50. The latching action of the pawl 50 on the drive pulley 47 is for "in-track" control purposes as is hereinafter described. Secured to the shaft of the pulley 47 at the inner side of the hub 48 is a small pinion gear 52 (FIGURES 10 and 11) which is in mesh with a larger gear 53 on a shaft 54 journaled in the standard 12. For reasons hereinafter explained, the gears 52 and 53 have a drive transmission ratio of 13 to 3. Freely journaled on the shaft 54 to the right side of the standard 12 is a large gear 55 in constant mesh with the gear 41 driven by the drive motor 32. The gears 41 and 55 have a drive ratio of 1 to 1. The gear 55 has a long hub 56 provided with a larger diameter flange 57 at its right end. Staked to the flange 57 near the rim thereof is a rightwardly extending stud 58 on which is journaled a planetary gear 59. This planetary gear is in mesh with a small pinion gear 60 secured to the shaft 54 driven by the scan motor 45 and is in mesh also with a gear 61 of equal diameter on a shaft extension 62 pinned to the left end portion of the feed screw 23. The shaft extension 62 has a worm 63 for driving an improved advance marker according to the invention hereinafter particularly described.

When the drive motor 32 is running and the scan motor 45 is at standstill, the mandrel 21 is driven by way of the flexible coupling 34, worm 38, gear 39, shaft 40, flexible coupling 44 and shaft 20. Rotation of the mandrel 21 revolves the magnetic belt about it and the mandrel 19. At the same time the gear 41 on the shaft 40 drives the gear 55 to revolve the planetary gear 59 around the pinion gear 60 and the gear 61 on the shaft 62 coupled to the feed screw at a rate of three revolutions for each revolution of the belt. The gear 60 is now held stationary by the latching engagement of the pawl 50 with the pulley 47. The gear 61 is provided with one less tooth than the gear 60 in order to cause the shaft 62 to be rotated by the interval of one tooth for each revolution of the planetary gear 58. The ratio of the number of teeth on the gears 61 and 60 may be, for example, 12:13 causing the feed screw to be turned 1/12 revolution for each revolution of the drum 21, which is 1/4 revolution for each revolution of the belt. This produces a steady uniform advance of the carriage across the magnetic belt as the belt is revolved with the result that the record-reproduce head describes a helical track on the record.

When the drive motor is at standstill and the scan motor 45 is driven, the planetary gear 59 is held from planetating and the pinion gear 60 drives the gear 61 at a speed greater than that of the pinion gear by the interval of one tooth on the gear 61 for each revolution thereof. For example, if the gears 60 and 61 have 13 and 12 teeth respectively as above-mentioned, the speed of the driven gear 61 will be 13/12 that of the pinion gear 60. This causes the feed screw to be driven very fast to shift the carriage rapidly across the magnetic belt. In order that the carriage can be so driven at a fast speed in either direction, the scan motor is of the reversable type. As will appear, the control system is such that the drive and scan motors can be operated alternatively but not simultaneously.

When the scan motor is driven to backspace the carriage so that the dictator may listen back to selected portions of his recorded dictation, it is necessary each time the machine is started in playback that the record-reproduce head register accurately with the recorded track. This is accomplished by the solenoid 51 being dropped out the instant the scan motor switch is turned off and causing the pawl 50 to engage the notch 49*a* (FIGURE 2) and stop the pinion gear 52 always in the same rotational position. A feature of the design is that the carriage is moved across the record through one track convolution for each full revolution of the pinion gear 52 during rapid scan. By providing a drive ratio between the gears 52 and 53 of 13:3, and between the gears 60 and 61 of 12:13, the feed screw is turned 1/4 revolution for each full revolution of the gear 52. Therefore, by always stopping the pinion gear 52 in the same rotational position at the end of each rapid scan it is assured that the record-reproduce head will stop in-track—i.e., in registration with the helix defined on the magnetic belt by the record-reproduce head.

An advance marker referred to generally as 65 and shown in detail in FIGURES 4–9 is designed to shift the machine back into recording condition when after backspacing the carriage and listening to a selected portion of one's recorded dication the carriage is returned to its prior position of farthest advance. In order that this automatic return to recording condition will occur immediately after the head has passed the farthest prior point of advance in its helical track about the record, a novel form of advance marker is provided having an exceptionally high resolving power. The present advance marker is of the type comprising two measuring elements normally held stationary in a predetermined neutral relationship. As the carriage is backspaced and returned one of these elements is moved in a corresponding manner relative to the other measuring element. In order to get a high resolving power it is necessary that the movable measuring element be moved through a relatively long distance for each increment of movement of the carriage. This is accomplished in a novel manner by mounting the movable measuring element to move in a helical path as will appear from the following detailed description.

Figures 6, 7:
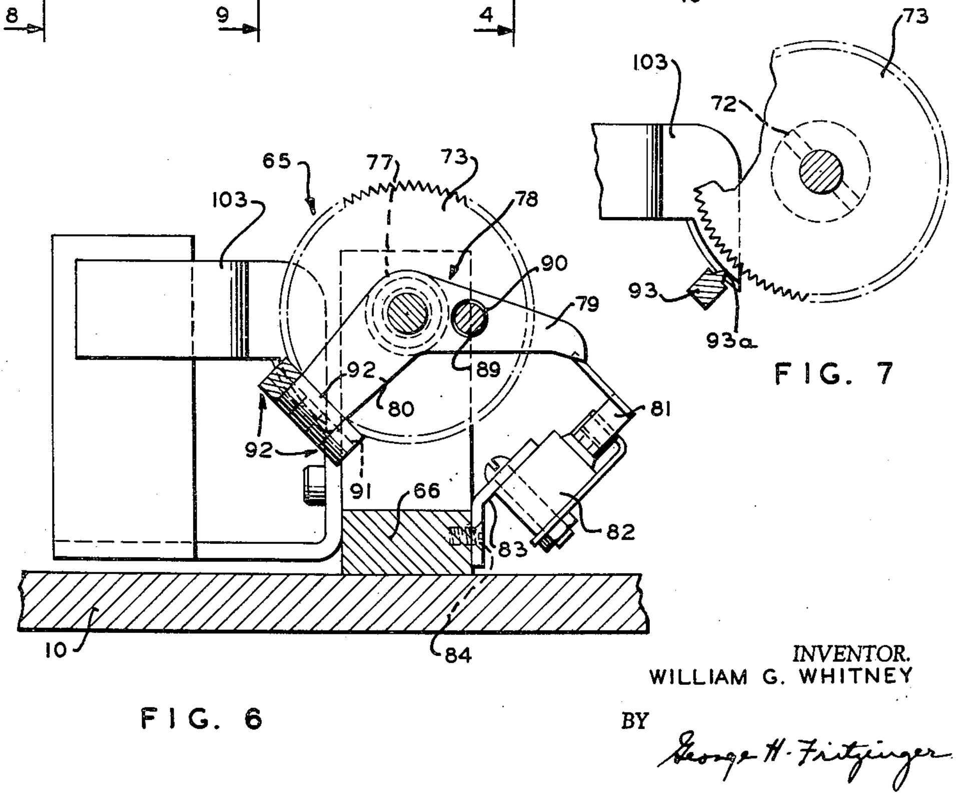
FIGURE 6 is a sectional view taken on the line 6—6 of FIGURE 4.
FIGURE 7 is a sectional view taken on the line 7—7 of FIGURE 4.

The advance marker comprises a frame 66 (FIGURE 4) having two closely spaced upright standards 67 and 68 at its rearward end and one standard 69 at its forward end all positioned in line from back to front. Journaled in the rear standards 67 and 68 is a shaft 70 having a gear 71 pinned to its intermediate portion between the standards and meshing with the worm 63. This shaft extends forwardly a short distance ahead of the intermediate standard 68 and thereon is pinned the hub 72 of a gear 73 having fine sharply pointed teeth. In the center opening of this gear at the forward side thereof there is mounted a flanged bearing 74 which receives a reduced end portion of a long shaft 75 securely mounted at its forward end on the front standard 69 by a screw 76. This stationary shaft 75 has a threaded portion 75*a* directly ahead of the gear 73 on which a hub 77 of a lever 78 is threaded. This lever has two oblique arms 79 and 80 as shown in FIGURE 6. The normal positioning of lever 78—which may be referred to as a measuing lever—is at the back end of the threaded portion 75*a* against the bearing 74. In this home or neutral position of the measuring lever the arm 79 thereof bears against a pushbutton 81 of a switch 82 mounted on a bracket 83 thereof—secured at 84 to the frame 66. Note should here be made that the pushbutton 81 and the tip of arm 79 which bears there against constitutes the two measuring elements of the advance clutch hereinbefore referred to, with the tip of the arm being the traveling one of the two elements.

Normal pressure of the arm 79 against the push switch 82 is obtained from a spring-tensioned drum 85 journaled on the shaft 75 ahead of the threaded portion 75*a*, the drum being retained between a front disk 86 pinned to the shaft and a back retainer ring 87. This drum is tensioned rotatably relative to the shaft 75 by a torsion spring 88 within the drum secured at its outer and inner ends to the drum and disk respectively. The rotatable drum is coupled to the lever 78 by a rearwardly extending pin 89 staked to the back wall of the drum and extending along the shaft 75 into sliding engagement with a clearance hole 90 in the arm 79 of the lever 78 (FIGURES 4 and 6). The other arm 80 of the lever 78 carries a pivot pin 91 transverse to the shaft 75 on the ends of which is a double fulcrumed rocker 92 having oppositely extending arms along the shaft 75. The rearward arm 93 of this rocker has a knife edge 93*a* extending past the gear 73 and biased into engagement therewith by a tension spring 94 hooked between the arm 93 and the hub 77 of lever 78, the inner hook of the spring being in a peripheral groove in the hub 77 as shown in FIGURE 4. The other arm 95 of rocker 92 extends forwardly past the spring tensioned drum 85 and serves as a trip arm for releasing the rocker from the gear 73. Operation of the trip arm in any rotational position thereof is by a cup 96 slidably mounted on a forward portion of the shaft 75 but restrained against rotational movement by a radial pin 96*a* depending therefrom and slidably engaging a front to back extending slot 97 in the frame 66 as shown in FIGURE 4. A compression spring 98 around the shaft 75 between the disk 86 and the inside wall of the cup normally presses the cup forwardly beyond the trip arm 95 against the front standard 69. Movement of the cup rearwardly into engagement with the trip arm is by means of a double rocker 99 each side of which has a right angular shape with upstanding and rearwardly extending arms as shown in FIGURE 4, the two sides being joined by a cross member 100 just back of the front standard 69. This double rocker embraces the frame 66 and is pivoted about midway of the length of its lower arms on a cross pin 101 in the frame 66. The lower arms have side fingers 102 at their rearward ends which when pressed downwardly cause the two upper arms to bear against the cup 96 at opposite sides of the shaft 75 and shift it rearwardly. The inner lip of the cup is beveled to cam the trip arm inwardly and release the lever 78 from the gear 72. If the lever 78 has been driven in its helical path from home position when this release occurs, it is returned instantly by the spring tensioned drum to its home position. The arm 93 of the rocker 92 is normally held disengaged from the gear 72 after the lever 78 is returned to home position by means of a switch arm 103 (FIGURE 6) which engages the tip of the rocker arm 93. Although the measuring lever 78 is thus in a free condition when in home position it does not then hold the switch 82 operated under influence of its torsion bias because the torsion spring 88 acting through the drum 85 and the lever is not strong enough to overcome the force by which the switchbutton 81 is biased into upoperated position.

The instant the on-off switch for the scan motor is closed to backspace the carriage at a fast speed the switch arm 103 is released from the rocker arm 93 causing this arm to engage the gear 73 under influence of the spring 94. The gear starts turning the measuring lever 78 on the screw threaded portion 75*a* of the shaft 75, causing the lever to move in a helical path towards the drum 85. The pitch of the screw thread 75*a* is such that in one revolution of movement of the lever 78 the tip of the measuring arm 79 just clears the pushbutton 81 of the switch 82. Thus, the measuring lever may be rotated a multiplicity of turns as the carriage is backspaced through the width of the magnetic belt, giving the measuring lever an expanded range of traveling movement with a correspondingly high resolving power. Regardless of the distance of backspacing of the carriage or whether the carriage is moved at normal or fast scan speeds, the linear movement of the tip of the measuring arm 79 in its helical path is in direct correspondence with the movement of the carriage across the record, with the result that when the arm 79 has been returned into contact with the pushbutton 81 of the switch 82 the record-reproduce head will be in registration with the point of farthest advance in the helical track which the head had described on the record. Upon further advance of the carriage through the pitch distance of one track convolution the arm 79 depresses the switch button 81 sufficiently to operate the switch 82. As will appear from the following description, operation of the switch 82 causes the record-reproduce relay RR to be activated into the record position shown in FIGURE 12, which in turn causes the switch arm 103 to disengage the rocker arm 93 from the gear 73. As soon as the rocker arm 93 is so disengaged from the gear 73 the switch button 81 moves the arm 79 back a small distance to the spring-balance position which it normally occupies.

Figure 12:
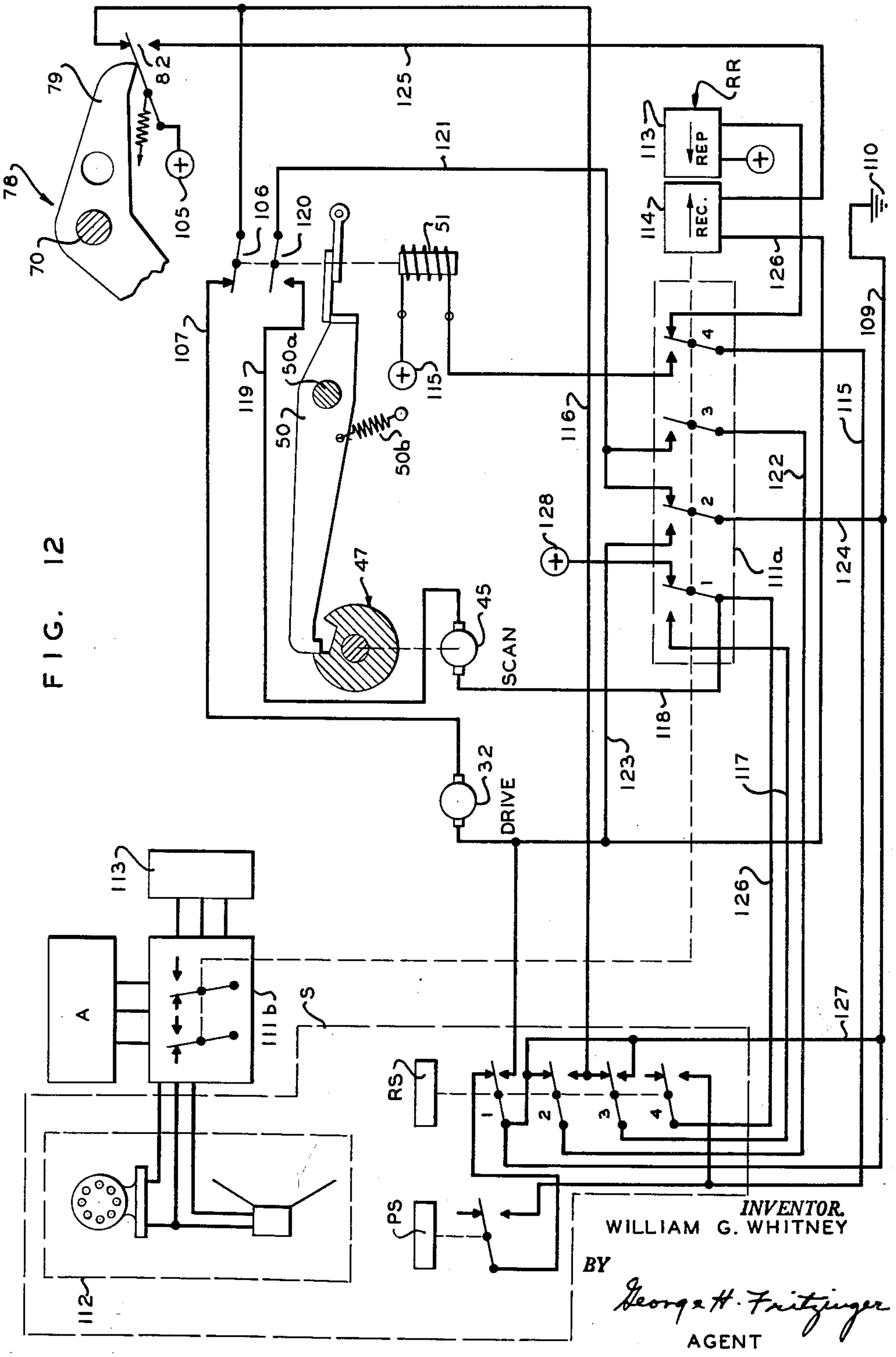
FIGURE 12 is a schematic circuit diagram for the control mechanisms of the invention.

The operation of the present system is herein next described particularly with reference to the schematic circuit diagram of FIGURE 12, showing the machine in record condition. When the record switch RS is pressed down the drive motor is started by a power circuit running from a source 105 via the advance clutch switch 82 at its upper contact, switch 106 of the centralizing solenoid 51, lead line 107, drive motor 32, section 1 of record switch RS at its lower contact and lead line 109 to ground at 110. At this moment the record-reproduce relay RR is in record position as shown. This relay controls one bank 111*a* of four switches and a second bank 111*b* the latter of which is an interchange switch interconnecting the microphone-speaker 112 in the dictator's handset S and a record cooperable record-reproduce translating device 113 with an amplifier A. The relay RR is of a standard differential latch type comprising "reproduce" and "record" coils 113 and 114 and respective armatures 113*a* and 114*a* pivoted respectively at 113*b* (FIGURE 8) and 114*b* (FIGURE 1) on axes at right angles to each other. These armatures have interlocking fingers 113*c* and 114*c* (FIGURES 1 and 8) adapted to cause the switch banks 111*a* and 111*b* to be latched each time the relay is operated. The relay RR is mounted on a plate 108 having a turned-up arm 108*a* at the back of the relay (FIGURE 8) secured to an angle bracket 108*b* mounted on the left side of the base portion of the standard 67 and 68. During the recording of dictation the switch RS is merely a start-stop switch for the drive motor 32. If the dictator desires to listen back to a selected portion of his recorded dictation, he releases the record switch RS and presses a playback switch PS on his dictator's handpiece S. This causes the reproduce coil 113 of the relay RR to be energized and shift the switch banks 111*a* and 111*b* to the left (FIGURE 12) in which position it becomes then latched by the interlocking fingers 113*c* and 114*c*. This causes the centralizing solenoid 51 to be operated from the source 115 through the switch pole 4 of bank 111*a* at its left contact, line 115, playback switch PS, switch pole 1 of record switch RS at its upper contact and lead line 109 to ground 110. This starts the scan motor 45 in the reverse direction by power from the source 105 through the advance clutch switch 82 at its upper contact, lead 116, switch pole 3 of the record switch RS at its upper contact, lead 117, switch pole 1 of the bank 111*a* at its left contact, lead 118, scan motor 45, lead 119, switch 120 of the centralizing solenoid 51, lead 121, switch pole 3 of bank 111*a*, lead 122, switch pole 2 of record switch RS at its upper contact and lead 109 to ground 110. Simultaneously as the relay RR is operated into its reproduce position responsive to pressing the playback switch PS, the armature 114*a* which carries the cam finger 103 releases rocker arm 93 into engagement with the gear 73 thereby causing the measuring arm 79 of the advance clutch to be turned in a helical path from its home position in accordance with the backspacing movement of the carriage from its prior position of farthest advance.

When the dictator has backspaced the carriage to the desired point, he releases the playback switch PS. The RR relay remains still in its reproduce position because of its latched condition but the centralizing solenoid 51 is dropped out at the playback switch causing the centralizing pawl 50 under influence of the bias spring 50*b* to engage slidably the bottom of the peripheral groove 49 and to interlock with the notch 49*a* when the latter comes into registration with the pawl. When the pawl so engages the notch 49*a* the record-reproduce head is in registration with the record track since the carriage is propelled by the pitch distance between successive track convolutions for each revolution of the pulley 47. As the pawl drops into the notch 49*a* to latch the pulley 47 the switches 106 and 120 of the centralizing solenoid 51 are returned to their unoperated position shown in FIGURE 12. The return of the switch 120 cuts off the power to the scan motor 45 and the concurrent closing of switch 106 starts the drive motor 32 from the source 105 through switches 82 and 106, the drive motor, lead 123, switch pole 2 of the bank 111*a* at its left contact and lead 124 to ground 110. Thus, the machine goes automatically into active reproduce condition at its backspaced position the instant the playback head 28 is positioned "in-track" following a release of the playback switch PS.

So long as both the playback switch PS and record switch RS are left released the machine will continue in active playback condition to reproduce the recorded dictation to the point where the recording last left off. When this prior position of farthest advance is reached the measuring arm 79 of the advance clutch makes contact with the switch button 81. Further, the machine will continue running beyond this point until the measuring arm 79 has pressed the switch button 81 sufficiently to operate the switch, the further advance of the carriage required to so operate the switch 82 being approximately the pitch distance between successive track convolutions on the record. The switch 82 is of the snap type so that it continues to make with its upper contact shown in FIGURE 12 until the snap operation occurs; vice versa as the switch button 81 is released the pole member of the switch continues to make with the lower contact of the switch until the switch snaps back to its normal position. Operation of the switch 82 shifts the RR relay back into its latched-record position by power from the source 105 through switch 82 at its lower contact, lead 125, coil 114 of RR relay, lead 126, pole 2 of bank 111*a* at its left contact and lead 124 to ground 110. Return of the RR relay to record position breaks the power circuit to the drive motor at pole 2 of bank 111*a* stopping further forward drive of the carriage. Further, as the RR relay is returned to record position the switch cam arm 103 disengages the rocker arm 93 from the gear 73 causing the measuring arm 79 to be restored to its home position and the switch 82 to be returned to its unoperated position shown in FIGURE 12. The record head stands now about one full track pitch ahead of the point of prior farthest advance. The machine is now ready for further recordation of dictation with the record switch RS functioning simply as a start-stop control for the drive motor 32.

If after the dictator has backspaced the carriage and listened to only a portion of his recorded dictation, he wishes to return quickly to the prior position of farthest advance for further recordation of dictation, he presses the record switch RS while the machine is in active reproducing condition and continues to hold the RS switch operated until the machine stops. This closes the power circuit for the centralizing relay 51 at pole 4 of the RS switch, the circuit running from source 115 through solenoid 51, pole 4 of the bank 111*a* at its left contact, lead 115, pole 4 of RS switch, lead 126, pole 1 of bank 111*a* at its left contact, lead 117, pole 3 of RS switch at its lower contact, lead 127 and lead 109 to ground 110. Operation of the centralizing solenoid 51 breaks the circuit of the drive motor 32 at 106 and closes the circuit of the scan motor at 120 with a polarity for operation in a forward direction—which is permitted because the pawl 50 is now disengaged from the pulley 47—the circuit for the scan motor 45 being now from source 105 through switch 82 at its upper contact, pole 2 of RS switch at its lower contact, pole 3 of bank 111*a* at its left contact, switch 120, scan motor 45, pole 1 of bank 111*a* at its left contact, pole 3 of RS switch at its lower contact and leads 127 and 109 to ground 110. The carriage is therefore advanced at a fast speed with the machine in reproducing condition. When the prior position of farthest advance is passed by about 1 track pitch the switch 82 is operated to its lower contact to remove power in the first instance from the scan motor 45 and to supply power from the source 105 to the coil 114 of the RR relay to shift the relay into record position and release the rocker arm 93 from the gear 73 permitting the advance clutch switch 82 to return to normal position. However, the pawl 50 will not normally register with the notch 49*a* at the instant the forward scanning is stopped with the result that the switch 106 remains open and the switch 120 remains closed for a further short interval. During this further short interval power of reverse polarity is supplied to the scan motor 45 from the source 128 through pole 1 of bank 111*a* at its right contact, lead 118, scan motor 45, lead 119, switch 120, lead 121, pole 2 of bank 111*a*, at its right contact and lead 124 to ground 110. Immediate reverse drive of the carriage therefore takes place—regardless of whether the RS switch is now held operated or not—through a partial track pitch distance until the pawl 50 registers with the notch 49*a* at which instant the recorder head will be in-track registration at its prior position of farthest advance. When the pawl 50 drops into the notch 49*a* switch 120 is opened to stop the scan motor and switch 106 is closed to prepare the circuit for the drive motor 32. The machine is now again ready for further recordation of dictation with the record switch RS functioning as a start-stop switch for the drive motor.

Figure 5:
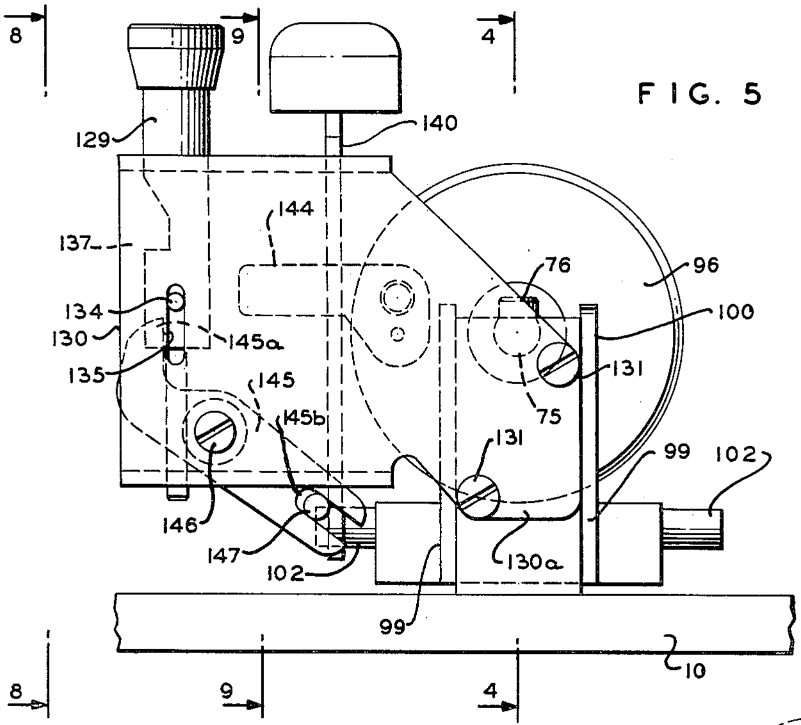
FIGURE 5 is an elevational view as seen from the line 5—5 of FIGURE 1.
Figure 8:
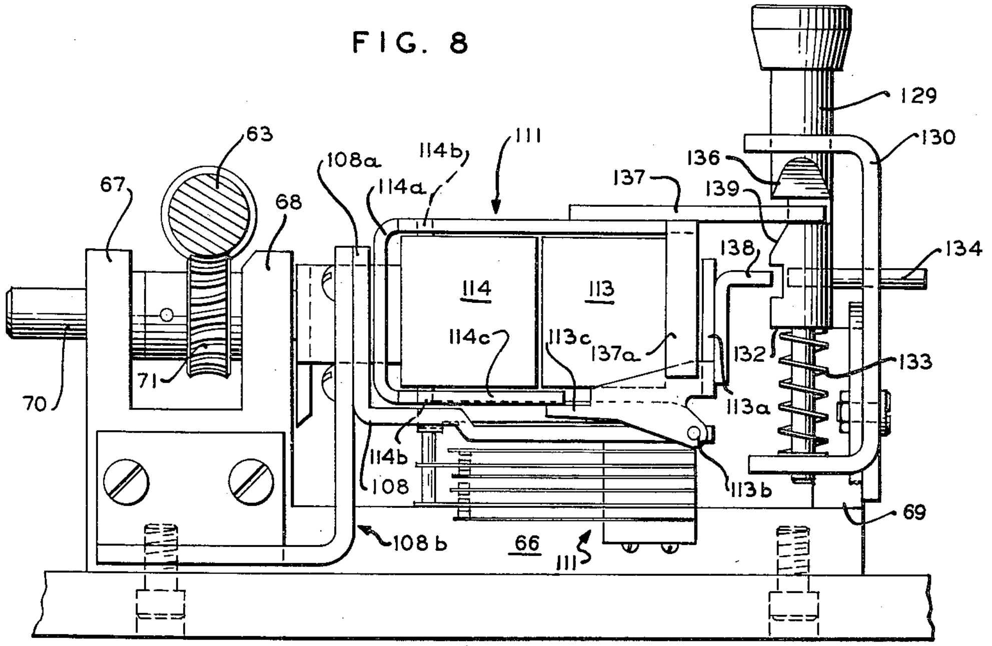
FIGURE 8 is an elevational view as seen from the line 8—8 of FIGURE 5 showing the RR relay in record position.

If the dictator desires to backspace the carriage and re-record some selected portion of his previously recorded dictation, he presses first the playback switch PS to backspace the carriage to the desired distance and then releases the playback switch and listens to the recorded dictation until the exact point is reached where the re-recording is to begin. When this exact point is reached he presses a re-record plunger 129 (FIGURES 1, 5 and 8) and holds it down for the duration of the time he wishes to record. The plunger 129 is mounted slidably in vertically aligned apertures provided in the upper and lower legs of a U bracket 130 having a rightwardly extending arm 130*a* (FIGURE 5) secured by screws 131 to the front face of the standard 69 of the advance marker frame 66. The plunger has a lower end portion of reduced diameter forming a shoulder 132. Between this shoulder and the lower leg of the bracket 130 is a compression spring 133 urging the plunger upwardly into a position defined by abutment of a cross pin 134 in the plunger against the upper end of a slot 135 in the vertical portion of the U bracket 130. On the plunger 129 below the upper leg of the bracket 130 is a cam face 136 engaged by a horizontal, forwardly extending arm 137 on the armature **114*a* of the relay RR (FIGURES 1, 5 and 8). Incidentally, this arm 137 has a depending side arm 137*a* for operating a bank of the RR relay switches shown in FIGURE 1. As the plunger 129 is pressed downwardly it cams the armature 114*a* clockwise as it appears in FIGURE 1 into a latched-record position. This breaks the circuit of the drive motor 32 at pole 2 of bank 111*a* to stop the machine. However, upon now pressing also the record switch RS the circuit of the drive motor is completed at pole 1 of record switch RS to place the machine in active record condition at the backspaced position of the carriage. When the plunger 129 is next released a finger 138 (FIGURE 8) extending forwardly from the armature 113*a* is cammed rearwardly by a second cam face 139** on the plunger to restore the RR relay into a latched-reproduce position. If by this time the dictator has already released the RS switch the machine will proceed in active reproduce condition, but if he has continued to hold the RS switch operated the machine will be shifted into fast forward scan, both as before described.

Figures 9, 10:
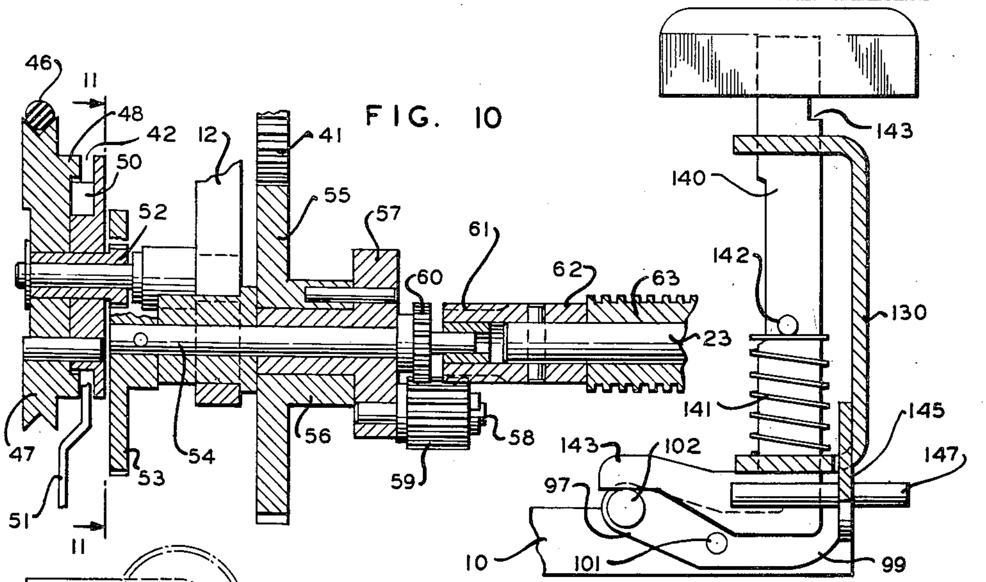
FIGURE 9 is a sectional view taken on the line 9—9 of FIGURE 5.
FIGURE 10 is a sectional view through the planetary system and the drive therefor constituting the novel advance marker of the invention.
Figure 11:
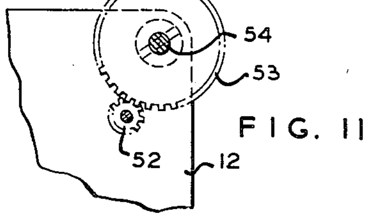
FIGURE 11 is a sectional view taken on the line 11—11 of FIGURE 10.

When the machine is to be used only for reproducing—ofttimes referred to as for transcribing—the dictator presses a transcribe plunger 140 mounted vertically at the right of the re-record plunger 129 in the U bracket 130 (FIGURES 1, 5 and 9). This plunger is urged upwardly by compression spring 141 between the bottom leg of the bracket 130 and a cross pin 142 in the plunger as shown in FIGURE 9. At its lower end below the bracket 130 the plunger has a rearwardly extending foot 143 overlying one of the side fingers 102 of the double rocker 99. Thus, when the plunger is depressed it turns the rocker 99 counterclockwise as it appears in FIGURE 4 to shift the cup 96 rearwardly. Furthermore, when the plunger 140 reaches its downward position it becomes latched by the plunger tilting slightly forwardly and causing a shoulder 143 thereon to engage the underside of the top leg of the bracket 130. This causes the cup 96 to be latched in its operated position, the effect of which is to maintain the advance clutch in a disabled condition. Also, by means of a side finger 144 on the cup 96, which comes to bear rearwardly against the armature **113*a* of the RR relay as the cup is shifted into its latched rearward position, the RR relay is maintained mechanically in reproduce position. The drive motor 32 is now put into continuous operation by a circuit running from the source 105 through the switch 82 at its upper contact, switch 106, drive motor 32, lead 123, pole 2 of the bank 111*a* at its left contact and lead 124 to ground 110. The transcriber plunger 140 provides therefore a means for starting the machine into a continuous active reproduce condition from any position of the carriage and with the advance clutch held in a disabled condition. For example, when a new record has been installed into the machine and the carriage has been returned to its start position with the RR relay shifted into normal record position as by any suitable means operated incidental to the mounting of the record but not herein necessary to show, the machine, except for the transcribe control feature, would not be operable for continuous playback of any previously recorded dictation on the newly mounted record since the playback switch is adapted primarily for playing back from a prior position of farthest advance. For example, upon pressing the playback switch with the carriage in such start position the machine would run through only one track convolution at which time the advance clutch switch 82** would be operated and the machine would be shifted back into record condition. However, with the transcribe control which shifts the advance clutch into a disabled condition, continuous playback of recorded dictation is permitted from any position on the record.

When transcribing has proceeded to the desired point, the transcribe plunger 140 may be released by pressing the top button rearwardly to disengage the shoulder 143 from the bracket 130. Alternatively, it may be released by pressing the re-record plunger 129. As this plunger is pressed the pin 134 engages the upper tip **145*a* of a lever 145 pivoted at 146 to the U bracket 130 (FIGURE 5) and cams this lever counterclockwise. The lower portion of the lever 145 extends obliquely downwardly to the right and has a slot 145*b* engaged by a transverse pin 147 on the lower end portion of the transcribe plunger 140. As the lever 145 is cammed counterclockwise it therefore exerts an upward thrust on the transcribe plunger with also a counterclockwise tilting action on the latter because of the pin slot connection between the lever 145 and the plunger 140 being at a distance ahead of the central axis of the plunger as shown in FIGURE 9. By this tilting action the shoulder 143 of the plunger 140 is disengaged from the bracket 130 to release the plunger 140**. The reason for releasing the transcribe plunger by the re-record plunger is to prevent mechanical jamming of the oppositely operable means on the RR relay controlled respectively by the re-record plunger and the transcribe plunger should the dictator press the re-record plunger during transcribing for the purpose of re-recording some portion of the recorded matter on the record.

The embodiment of my invention herein particularly shown and described is intended to be illustrative and not limitative of my invention since the same is subject to changes and modifications without departure from the scope of my invention, which I endeavor to express according to the following claims.

I claim:

1. In a phonographic machine including a record supporting device and a record-cooperable translating device, one of said devices being mounted for advance and backspace movement relative to the other: a mechanism for measuring the displacement of said one device from any selective position in its path of travel comprising a first measuring element, a second cooperating measuring element mounted for movement in a helical path having a pitch sufficient to clear said first element in the first revolution thereof from its home position, and a clutch engageable to couple said second element to said one device in any position of the latter to move said second element in its helical path in correspondence with the displacement of said one device.

2. The combination set forth in claim 1 wherein said clutch comprises a radial arm on said second measuring element, a stationary screw on which said second measuring element is threaded, a rotatable finely toothed gear mounted coaxially with said screw and coupled to said one device to cause the gear to rotate in correspondence with the advance and backspace movements of said one device, a rocker mounted transversely of said radial arm and pivoted thereto, and an arm on said rocker extending past said gear through a distance at least equal to the maximum translational movement of said second measuring element along said screw for engaging said gear and providing a drive connection between the gear and said second measuring element.

3. The combination set forth in claim 2 including means biasing said rocker into engagement with said gear, and control means operable to disengage said rocker only when said second measuring element is in home position.

4. The combination set forth in claim 3 including a torsion spring operable continuously on said second measuring element throughout its rotational movement along said screw for biasing the second measuring element to home position; and shiftable means operable to disengage said rocker from said gear in any operated position of said second measuring element along said screw and to maintain the rocker disengaged throughout its return to home position responsive to said torsion spring.

5. In a phonographic machine including a rotatable record supporting device and a record-cooperable translating device, means mounting one of said devices for traveling movement relative to the other, and a drive system for rotating said record supporting device and for concurrently progressively advancing said one device to cause said translating device to describe a helical track on a supported record; the combination of means for backspacing said one device from any position in its path of travel while the record supporting device is not rotating; a control switch; an operating member for said switch spring-biased there against with insufficient force to operate the switch; a clutch for coupling said operating member to said one device to cause that operating member to be moved away from and toward said switch in correspondence with the backspacing and return movements of said one device from any selected position in its path of travel, said switch having an operating movement corresponding to less than the pitch between successive convolutions of said helical track causing the switch to be operated when said one device has been advanced past its prior position of farthest advance by less than the track pitch; and an in-track control means responsive to operation of said control switch for disengaging said clutch and for backspacing said one device to its said prior position of farthest advance.

6. In a phonographic machine including a rotatable record supporting device and a record-cooperable translating device, means mounting one of said devices for traveling movement relative to the other, and a drive system for rotating said record supporting device and concurrently progressively advancing said one device to cause said translating device to describe a helical track on a supported record; the combination of a drive mechanism for imparting a traveling movement to said one device in a backspacing direction from any selected prior position of farthest advance and for returning said one device comprising a rotatable drive member coupled to said one device to move the latter through the pitch distance betwen successive track convolutions for each full revolution of the former; means effective in only one position of rotation of said drive member for latching the same; means for holding said latching means engaged while said drive system is in operation; a motor for said drive member; and means for disengaging said latching means and starting said motor while said drive system is at a standstill.

7. The combination set forth in claim 6 including means for engaging said latch means and cutting off power to said motor in the sequence here named.

8. A scanning mechanism for the traveling carriage of a phonographic machine comprising a scan motor, a rotatable drive member driven by said motor and coupled to said carriage to move the latter through the pitch distance betwen successive track convolutions on the record for each full revolution of the drive member; means effective in one position only of the drive member for latching the same against rotation; and means responsive to a shifting of said latching means into effective position for stopping said scan motor.

9. In a phonographic machine including a rotatable record supporting device and a record-cooperable translating device, means mounting one of said devices for traveling movement relative to the other, and a drive system for rotating said record supporting device and for concurrently progressively advancing said one device to cause said translating device to describe a helical track on a supported record; a scan mechanism for shifting said one device while the record support is not in rotation; means for latching said scan mechanism while said drive system is in operation to cause said translating device to describe a helical track on the record; means for starting and stopping said drive system; means for disengaging said latch and starting said scan mechanism in the sequence here named, said latch comprising a rotatable drive member of said scan mechanism and a pawl for locking said drive member in one position only; and a coupling means between said drive member and said one device for moving the latter through the pitch distance between successive track convolutions on the record for each revolution of said drive member.

10. The combination set forth in claim 9 including means responsive to movement of said latch into effective position for stopping said scan mechanism and starting said drive system.

11. Combination set forth in claim 9 including means responsive to movement of said latch into ineffective position for stopping said drive system.

12. The combination set forth in claim 9 including means responsive to movement of said latching means into effective position and ineffective position respectively for disabling and abling said start-stop control means for said drive system.

13. In a phonographic machine including a rotatable supporting device for a record, a record-cooperable translating device, one of said devices being mounted for traveling movement relative to the other; the combination of a lead screw engaged by said one device for progressively moving same in its path of travel; a drive motor coupled to said supporting device for rotating the record; and a drive coupling between said motor and lead screw for progressively moving said one device concurrently as the record is rotating whereby to cause the translating device to describe a progressive track in a convoluted manner on the record comprising a first gear mounted coaxial with said lead screw, a second gear on an end of said lead screw confronting said first gear, said gears having respective numbers of teeth different by one, a single planetary gear mounted to revolve bodily around said first and second gears while in constant mesh therewith, means for holding said first gear stationary, and a drive coupling betwen said drive motor and said planetary gear for revolving the latter bodily around said gears to turn said lead screw as said record is rotated.

14. The combination set forth in claim 13 including a scan motor operable during standstill of said drive motor and coupled to said first gear for rotating the latter to impart a traveling movement between said translating device and the record while the record is not being rotated.

15. The combination set forth in claim 14 comprising a drive coupling between said scan motor and said first gear including a drive wheel having a drive transmission ratio betwen it and said lead screw adapted to require one full revolution of said drive wheel while said planetary gear is held constrained against revolving movement to move said translating device by the pitch distance between successive track convolutions on the record, a latch operable to hold said drive wheel in one position only, means for rendering said latch operative while said drive motor is running, and means operative while said drive motor is stopped for disengaging said latch and starting said scan motor.

16. The combination set forth in claim 15 including control means operable to release said latch to cause the same to stop said drive wheel when the same reaches said one position whereby each scanning movement is stopped with said translating device in registration with the track on the record, and means for shutting off power to said scan motor responsive to the latching of said drive wheel.

References Cited in the file of this patent

UNITED STATES PATENTS

| | | |
|---|---|---|
| 856,967 | Lewis | June 11, 1907 |
| 2,106,778 | Volk | Feb. 1, 1938 |
| 2,548,831 | Trevitt et al. | Apr. 10, 1951 |
| 2,622,001 | Cooley | Dec. 16, 1952 |
| 2,647,752 | Barker | Aug. 4, 1953 |
| 2,756,057 | Parkinson | July 24, 1956 |